Aug. 15, 1967 W. E. BRUNING 3,335,522
NAILER STRIP FOR VEHICLE DOOR
Filed May 3, 1965
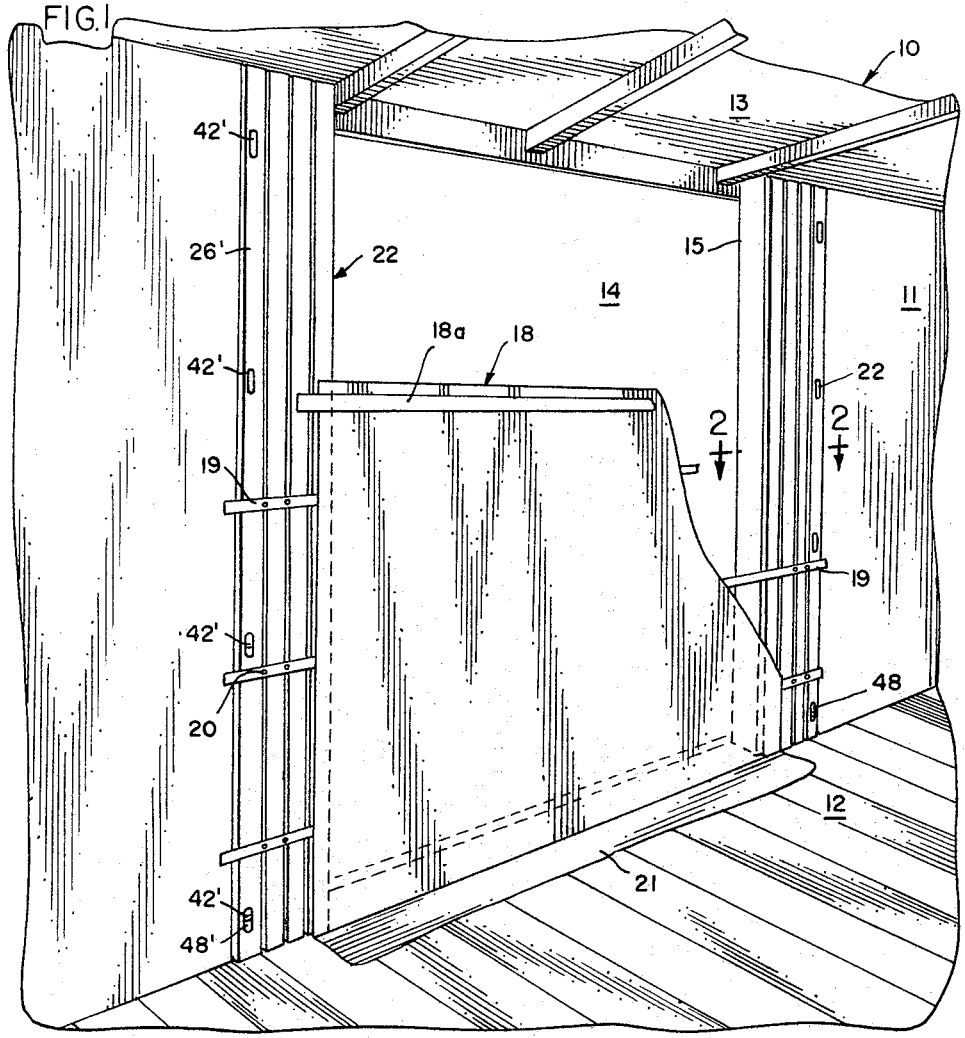
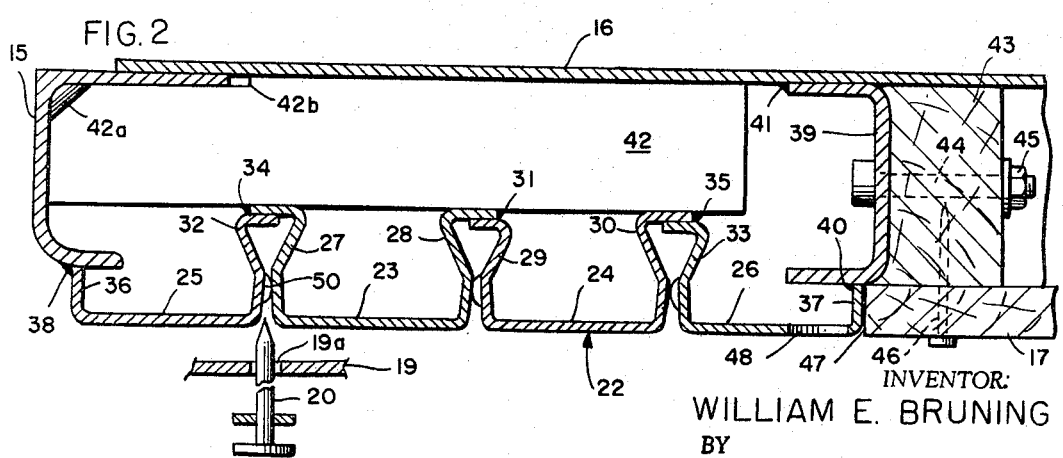
INVENTOR:
WILLIAM E. BRUNING
BY
Dawson, Tilton, Fallon, Lungmus & Alexander
ATT'YS

United States Patent Office 3,335,522
Patented Aug. 15, 1967

3,335,522
NAILER STRIP FOR VEHICLE DOOR
William E. Bruning, Omaha, Nebr., assignor of one-half each to International Paper Company, New York, N.Y., a corporation of New York, and the Stanley Works, New Britain, Conn., a corporation of Connecticut
Filed May 3, 1965, Ser. No. 452,633
3 Claims. (Cl. 49—34)

This invention relates to a nailer strip for a freight vehicle door and finds utility in securing temporary doors in grain carrying boxcars.

This invention is an improvement on my prior patent, No. 3,052,292, which also dealt with the problem of providing a permanent receiving member for nails used to secure temporary doors. However, there was difficulty in economically installing the member so that many cars continued the use of wooden nailing strips.

It is, therefore, a general object of this invention to provide a superior nailing strip for installation in a freight vehicle along with the novel method of installation thereof. According to the instant invention, the conventionally employed wooden nailing strips can be readily replaced and the provision of a structure and method achieving this replacement constitutes another object of the invention.

Other objects and advantages of the invention may be seen in the details and construction and operation set down in the following specification.

The invention is explained in conjunction with an illustrative embodiment in the accompanying drawing, in which:

FIG. 1 is a fragmentary perspective view of the interior of a boxcar showing the inventive nailing strips installed in place; and FIG. 2 is an enlarged fragmentary sectional view such as would be seen along the sight line 2—2 applied to FIG. 1.

In the illustration given and with particular reference to FIG. 1, the numeral 10 designates generally a freight vehicle such as a railroad boxcar. The numeral 11 designates the usual sidewall, the numeral 12 the floor and the numeral 13 the roof. The sidewall 11 is interrupted to provide a doorway 14 which is defined by vertically extending doorposts 15 (only one of which is seen in FIG. 1). The freight vehicle is further defined by an outer metal sheath 16 (see FIG. 2) and an inner wooden lining as at 17.

The doorway 14 is closed partway of its height by means of a grain door panel generally designated 18. The panels 18 are usually constructed of cellulosic material such as corrugated paperboard and have laminated thereto elongated metal straps as at 19 which are secured by nails 20 extending into the sidewalls 11. The grain door panel also usually is equipped with a door flap 21 abutting the floor 12. The particular door panel illustrated can be seen in greater detail in U.S. Patent 2,966,214.

The combination just described is well-known. Grain door panels such as that designated 18 have been used widely to confine grain, the usual outer sliding storm door being ineffective for this purpose. The panels 18 are usually installed to a height of six feet above the floor 12 after which the grain is introduced over the panel 18. Thereafter, the slding storm door is closed and the vehicle moved to a trade center such as Chicago where the grain is sampled for sale. This involves opening the outer door and an artisan climbing into the boxcar (over the climb-board 18a) to take samples. Thereafter, the car is again sealed and delivered to the buyer. Once the car is received, the panel 18 is ruptured by a ram or other unloading device so as to remove the securement of the straps 19 from the interior of the car. In the course of time with the originally installed wooden nailing posts, these posts become splintered and inadequate to anchor the metal straps against the unusual stresses encountered during shipment, i.e., humping, bumping, jerking, etc., of the freight car. This is avoided by the nailing strips or posts of the invention which are generally designated 22.

Each strip 22 includes (in the illustration given) a plurality of 3″ wide elongated (10′ long) central sections as at 23 and 24 (see FIG. 2). Also provided are end sections, similarly elongated, and designated 25 and 26. Each of the central sections is equipped with generally L-shaped integral and flanges as at 27 and 28 relative to the section 23 and 29 and 30 relative to the section 24. The abutting, confronting L-shaped flanges are secured as by welding at 31 relative to the flanges 28 and 29. The flange 27 of the section 23 is secured as by welding at 34 to an L-shaped integral flange provided on the end section 25 while the flange 30 of the section 24 is welded as at 35 to the corresponding flange 33 of the other end section 26. Each of the end sections 25 and 26 is equipped with a plain flange as at 36 and 37, respectively. The flange 36 is weldably secured to the doorpost channel 15 as at 38 while the plain flange 37 of the section 26 is weldably secured as at 40 to a supplemental channel 39. Supplemental channel 39 is additionally welded to the sheath 16 as at 41. Weldably secured to the sheath 16 and the doorpost channel 15 is a plurality of backer bars 42 which serve to restrict distortion of the nailer strip made up of the composite sections 23–26.

The numeral 43 (still referring to FIG. 2) designates a supplemental stud which is boltably secured to the supplemental channel by means of a bolt 44 and nut 45 and to which is attached the lining 17 by means of nails 46.

In the installation of the nailer strip 22, the originally provided wooden nailing post is removed along with a section of the lining 17 as by making a vertical saw cut along the edge now designated 47 in FIG. 2. This will expose a 12 inch width of the sheath 16. Thereafter, the assembly of the supplemental stud 43 and the supplemental channel 39 (secured by the bolt-nut combination 44 and 45) is inserted between sheath 16 and the lining 17. Here it will be appreciated that the lining 17 ordinarily is supported on vertical studs which may be spaced on three foot centers along the length of the car 10. Without the supplemental stud 43, the lining 17 would be cantilevered several feet and, thus, liable to splintering, breakage, etc., during usage. At this juncture, the lining 17 may be secured to the stud 43 by means of additional nails 46 after which the supplemental channel 39 is spot welded to the sheath as at 41.

Thereafter, the backer bars 42 are installed by welding the same to the doorpost channel 15 and the sheath 16— in the illustration given, four such backer bars are provided on three foot vertical centers as at 41′ in FIG. 1. The bars 42 are cut away as at 42a and 42b to accommodate them to the channel 15.

At this point, the nailer strip 22 is installed which is provided as the single unit. One of the plain flanges 36 or 37 (it will be appreciated that the nailer strip is reversible) is secured to the doorpost 15 as at 38. The other plain flange of the end section 26 abuts the lining 17 and for the purpose of spot welding the flange 37 to the supplemental channel 39, I provide access slots as at 48 and 48′ in the end sections 26 and 26′ (the section 26′ being seen in FIG. 1). At this point, the installation is complete and the straps 19 of the panel 18 may be secured by the usual double-headed nails 20 (see FIG. 2) which pass through openings 19a within the straps 19 and thereafter enter the nailing channels or grooves defined by the confronting L-shaped flanges on the various sections as at 27 and 32 in FIG. 2. I also find it advantageous to provide a longitudinal bead as at 50 running the length of one of the flanges so as to utilize the inherent resiliency of the metal flanges to develop a compressing force on the nail 20. Still further, the flanges 27 and 32, for example, may be spot welded together in the vicinity of the point where the bead 50 abuts the flange 27 at longitudinally spaced points (approximately three-foot centers) to insure further compressive action.

With the inventive arrangement, there is provided a permanent nailing strip, easily installed, and which integrates operationally with the car lining 17. No longer is there any requirement that nails 20 be angled or "tensioned" so as to insure proper securement within the wooden nailing strips previously used. Thus, ram removal of the door does not result in a deformation or splintering as was the case previously.

While in the foregoing specification, a detailed description of an embodiment of the invention has been set down for the purpose of illustration, many variations in the details herein given may be made by those skilled in the art without departing from the spirit and scope of the invention.

I claim:

1. In combination, a freight vehicle having a sidewall doorway defined by vertically extending doorposts, a metal nailer strip secured to each doorpost and extending generally parallel to each sidewall, a supplemental channel secured to said sidewall and extending parallel to but spaced from each doorpost, a vertically extending wooden stud releasably secured to said supplemental channel, said strip being weldably secured to its associated supplemental channel, said strip including a plurality of vertically elongated sections arranged in side-by-side relation to provide a generally flat, interrupted bearing surface, said sections along adjacent edges being equipped with flanges arranged to form vertically extending nail receiving grooves, said vehicle being equipped with an interior lining secured to said stud and abutting said nailing strip, a strap-equipped panel positioned across said doorway, nails extending through end sections of said strap into said nail grooves, said grooves being so arranged and constructed to resiliently clamp said nails, and backer plate means secured to said sidewall for reinforcing said nailing strip.

2. The structure of claim 1 in which the section of said strip adjacent said flange is equipped with a plurality of vertically spaced slots for welding equipment access to secure said strip to said supplemental channel.

3. A method of installing nailer strips in freight vehicles comprising removing a portion of the vehicle lining adjacent a doorpost, weldably securing a supplemental channel and stud to the sheath of the vehicle with said stud being interposed between said lining and sheath, weldably securing backer plates between said doorpost and channel, and weldably securing a grooved nailer strip to said doorpost and channel, said strip being equipped with slots for access welding equipment to connect said strip and channel whereby said strip is adapted to lie substantially flush with and abut said lining so as to constitute a substantial continuation thereof.

References Cited
UNITED STATES PATENTS

| | | | |
|---|---|---|---|
| 2,931,470 | 4/1960 | Brown | 52—364 |
| 3,052,292 | 9/1962 | Bruning | 160—368 |
| 3,102,613 | 9/1963 | Johnston | 52—364 |
| 3,152,669 | 10/1964 | Johnston | 52—364 |

DAVID J. WILLIAMOWSKY, *Primary Examiner.*

HARRISON R. MOSELEY, *Examiner.*

A. I. BREIER, *Assistant Examiner.*